United States Patent
Camagna et al.

(10) Patent No.: US 7,368,798 B2
(45) Date of Patent: May 6, 2008

(54) INTEGRATED DC/DC CONVERTER SUBSTRATE CONNECTIONS

(75) Inventors: John R. Camagna, El Dorado Hills, CA (US); Sajol Ghoshal, Austin, TX (US)

(73) Assignee: Akros Silicon Inc., Folsom, CA (US)

( * ) Notice: Subject to any disclaimer, the term of this patent is extended or adjusted under 35 U.S.C. 154(b) by 203 days.

(21) Appl. No.: 11/282,804

(22) Filed: Nov. 18, 2005

(65) Prior Publication Data

US 2006/0214253 A1 Sep. 28, 2006

Related U.S. Application Data

(60) Provisional application No. 60/665,766, filed on Mar. 28, 2005.

(51) Int. Cl.
*H01L 29/00* (2006.01)

(52) U.S. Cl. ............. 257/499; 370/395.52; 370/395.53; 370/910; 379/324; 379/413; 379/93.36; 455/574

(58) Field of Classification Search ................ 257/324, 257/399.01, 413, 413.01
See application file for complete search history.

(56) References Cited

U.S. PATENT DOCUMENTS 6,181,008 B1 * 1/2001 Avery et al. ................ 257/723

* cited by examiner

*Primary Examiner*—Minhloan Tran
*Assistant Examiner*—Benjamin Tzu-Hung Liu

(57) ABSTRACT

Embodiments of the present invention provide an integrated circuit (IC) having an integrated DC-DC power converter therein. This IC is operable to support the distribution of combined power and data signals in a network environment such as an Ethernet network according to protocols such as the power over Ethernet (PoE) protocol. The IC includes a DC-DC power converter, a power feed circuit, and a network physical layer (PHY) module, wherein the PHY module may contain fine line structures susceptible to damage when exposed to excessive voltages. To prevent or reduce the likelihood of damage to the PHY module from voltages supplied to the DC-DC power converter, a common substrate ground is shared between the IC components.

23 Claims, 16 Drawing Sheets

INTEGRATED DC/DC CONVERTER SUBSTRATE CONNECTIONS

CROSS REFERENCE TO RELATED APPLICATIONS

This application claims the benefit of priority to and incorporates herein by reference in its entirety for all purposes, U.S. Provisional Patent Application No. 60/665,766 entitled "SYSTEMS AND METHODS OPERABLE TO ALLOW LOOP POWERING OF NETWORKED DEVICES," by John R. Camagna, et al. filed on Mar. 28, 2005. This application is related to and incorporates herein by reference in its entirety for all purposes, U.S. patent application Ser. No. 11/207,595 entitled "METHOD FOR HIGH VOLTAGE POWER FEED ON DIFFERENTIAL CABLE PAIRS," by John R. Camagna, et al. filed Aug. 19, 2005; and U.S Pat. Ser. No. 11/207,602 entitled "A METHOD FOR DYNAMIC INSERTION LOSS CONTROL FOR 10/100/1000 MHZ ETHERNET SIGNALLING," by John R. Camagna, et al., filed Aug. 19, 2005.

TECHNICAL FIELD OF THE INVENTION

The present invention relates generally to the integration of DC/DC power conversion within power over Ethernet devices.

BACKGROUND OF THE INVENTION

Many networks such as local and wide area networks (LAN/WAN) structures are used to carry and distribute data communication signals between devices. The various network elements include hubs, switches, routers, and bridges, peripheral devices, such as, but not limited to, printers, data servers, desktop personal computers (PCs), portable PCs and personal data assistants (PDAs) equipped with network interface cards. All these devices that connect to the network structure require power in order to operate. The power of these devices may be supplied by either an internal or an external power supply such as batteries or an AC power via a connection to an electrical outlet.

Some network solutions offer to distribute power over the network in addition to data communications. The distribution of power over a network consolidates power and data communications over a single network connection to reduce the costs of installation, ensures power to key network elements in the event of a traditional power failure, and reduces the number of required power cables, AC to DC adapters, and/or AC power supplies which create fire and physical hazards. Additionally, power distributed over a network such as an Ethernet network may provide an uninterruptible power supply (UPS) to key components or devices that normally would require a dedicated UPS.

Additionally, the growth of network appliances, such as but not limited to, voice over IP (VOIP) telephones require power. When compared to their traditional counterparts, these network appliances require an additional power feed. One drawback of VOIP telephony is that in the event of a power failure, the ability to contact to emergency services via an independently powered telephone is removed. The ability to distribute power to network appliances or key circuits would allow network appliances, such as the VOIP telephone, to operate in a similar fashion to the ordinary analog telephone network currently in use.

The distribution of power over Ethernet network connections is in part governed by the IEEE Standard 802.3 and other relevant standards. These standards are incorporated by reference. However, these power distribution schemes within a network environment typically require cumbersome, real estate intensive, magnetic transformers. Additionally, power over Ethernet (PoE) requirements under 802.3 are quite stringent and often limit the allowable power.

There are many limitations associated with using these magnetic transformers. Transformer core saturation can limit the current that can be sent to a power device. This may further limit the performance of the communication channel. The cost and board space associated with the transformer comprise approximately 10 percent of printed circuit board (PCB) space within a modern switch. Additionally, failures associated with transformers often account for a significant number of field returns. The magnetic fields associated with the transformers can result in lower electromagnetic interference (EMI) performance.

However, magnetic transformers also perform several important functions such as providing ground protection, DC isolation and signal transfer in network systems. Additionally, integrating devices that perform these functions may give rise to new problems. Thus, there is a need for an improved approach to providing ground protection in a network environment that addresses limitations imposed by magnetic transformers while maintaining the benefits thereof.

SUMMARY OF THE INVENTION

Embodiments of the present invention provide an integrated circuit (IC) that includes non-magnetic transfer and choke circuitry (i.e. power feed circuit), DC-DC power converter, and Ethernet physical layer (PHY) module. Unlike prior solutions where these individual components may be implemented on a board or as discreet components where each component may be individually grounded, combining these components within an individual integrated circuit creates new and unique problems. For example, the Ethernet PHY module which may include fine line structures, if not properly grounded may float to the supply voltage of the DC/DC power converter. In such a case, the Ethernet PHY and its fine line structures may be exposed to a 48 volt differential which could potentially destroy such fine line structures. Therefore, the present invention provides a common substrate ground that may be made available to the power feed circuit, DC/DC power converter, and Ethernet PHY module. This ensures that fine line structures are not exposed to the potential hazards of a floating ground.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION

Figure 1A:
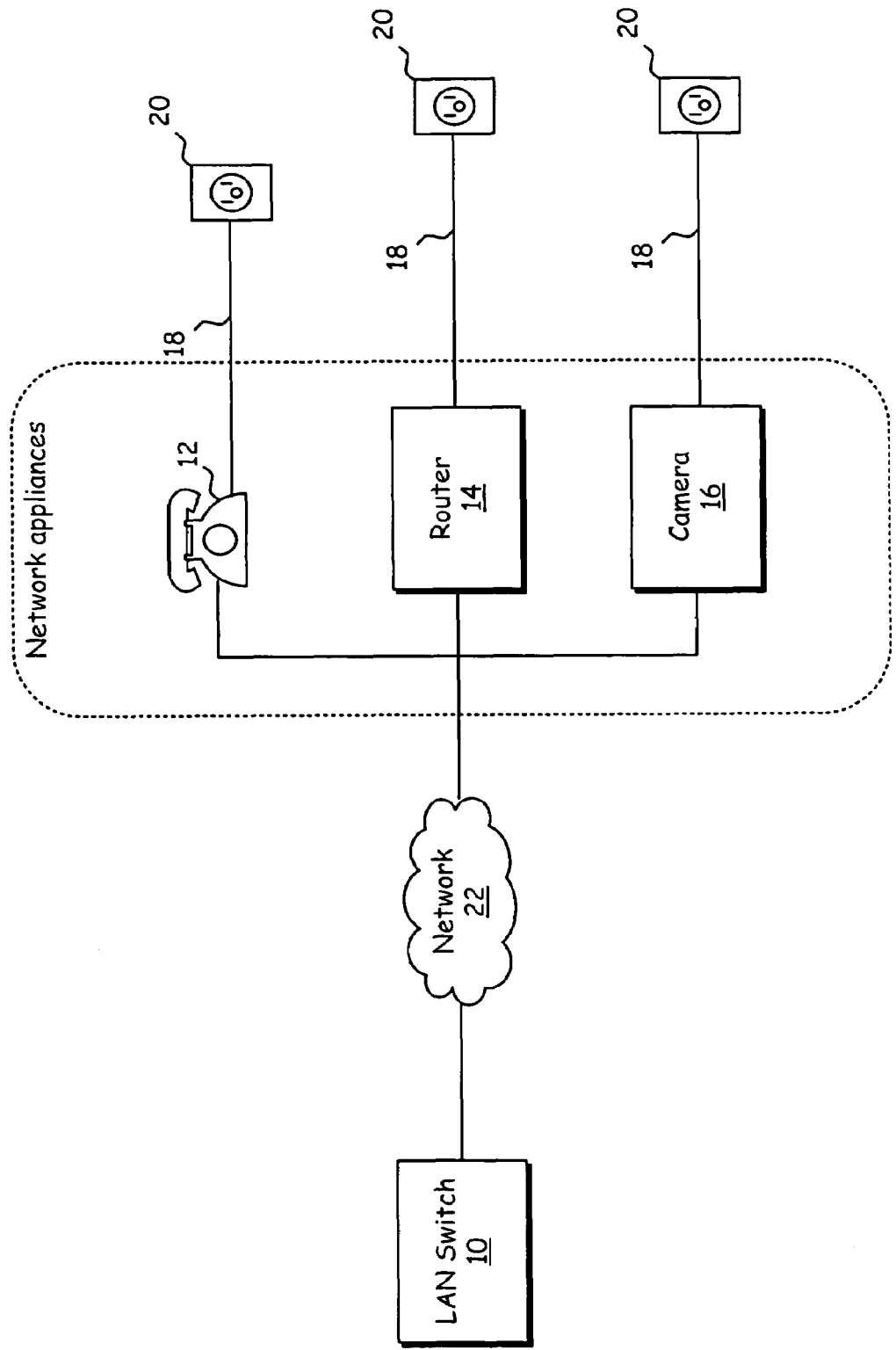
FIG. 1A depicts current Ethernet network appliances attached to the network and powered separately and their separate power connections.

Preferred embodiments of the present invention are illustrated in the FIGS., like numerals being used to refer to like and corresponding parts of the various drawings.

The 802.3 Ethernet Standards, which is incorporated herein by reference, allow loop powering of remote Ethernet devices (802.3af). The Power over Ethernet (PoE) standard and other like standards intends to standardize the delivery of power over Ethernet network cables in order to have remote client devices powered through the network connection. The side of link that supplies the power is referred to as Powered Supply Equipment (PSE). The side of link that receives the power is referred to as the Powered device (PD).

Replacing the magnetic transformer of prior systems while maintaining the functionality of the transformer has been subsumed into the embodiments of the present invention. In order to subsume the functionality of the transformer, the circuits provided by embodiments of the present invention, which may take the form of ICs or discrete components, are operable to handle these functions. These functions may include, in the case of an Ethernet network application:

1) coupling of a maximum of 57V to the IC with the possibility of 1V peak-peak swing of a 10/100/1000M Ethernet signaling, (2.8Vp_p for MAU device);
2) splitting or combining the signal; 57V DC to the 802.3af Power Control unit and AC data signal to the PHY (TX and RX), while meeting the high voltage stress.
3) coupling lower voltage (5 v and 3.3 v) PHY transceiver to high voltage cable (57V)
4) supplying power of 3.3V or 12V through DC-DC peak converter;
5) withstanding system-level lighting strikes: indoor lighting strike (ITU K.41); outdoor lighting strike (IEC 60590)
6) withstanding power cross @60 Hz. (IEC 60590)
7) fully supporting IEEE 802.3af Specification Other network protocols may allow different voltage (i.e., a 110 volt circuit coupling to the IC) data rates (i.e., 1 GBPS or higher), power rating.

In a solid-state implementation, common mode isolation between the earth ground of the device and the cable is necessarily required. Fixed common mode offsets of up to 1500V are possible in traditional systems. Embodiments of the present invention deliver power via cable and the earth ground is used solely for grounding of the device chassis. As there is no DC electrical connection between the earth and PoE ground, large voltage offsets are allowable. The PSE side has a data connection which may be optically or capacitively isolated. The PSE power supply is isolated as well.

Second, another transformer function provides surge and voltage spike protection from lightning strike and power cross faults. Wires inside the building comply with the ITU recommendation K.41 for lightning strikes. Lines external to the building must comply with IEC60950. Lightning strike testing as specified in these Standards consists in a common mode voltage surge applied between all conductors and the earth or chassis ground. As embodiments of the present invention have no DC connection to earth ground, minimal stress will occur across the device, thus simplifying the circuits required by embodiments of the present invention.

In the case of 802.3.af, power is delivered via the center tap of the transmit transformer and receive signal transformers for transformer based designs. The embodiments of the present invention may take up to 400 ma DC from the common mode of the signal pair without disturbing the AC (1 MHz-100 MHz) differential signals on the transmit/receive pairs.

Embodiments of the present invention are operable to support PoE side applications as well. As several functions are integrated together, the IC substrate is common to all major system components such as the Ethernet PHY and DC/DC converter. These highly integrated applications may give rise to addition problems which did not occur when the system was implemented as discrete components. One such problem is that when coupled to a power supply, the local ground may float up to the supply voltage. This is not a problem when the low voltage components and high voltage components are discrete IC components. However, when the low voltage components and high voltage components are integrated onto a single substrate, the voltages across the low voltage components (i.e. fine line structures or other sensitive circuits) can easily destroy the IC device.

Figure 1B:
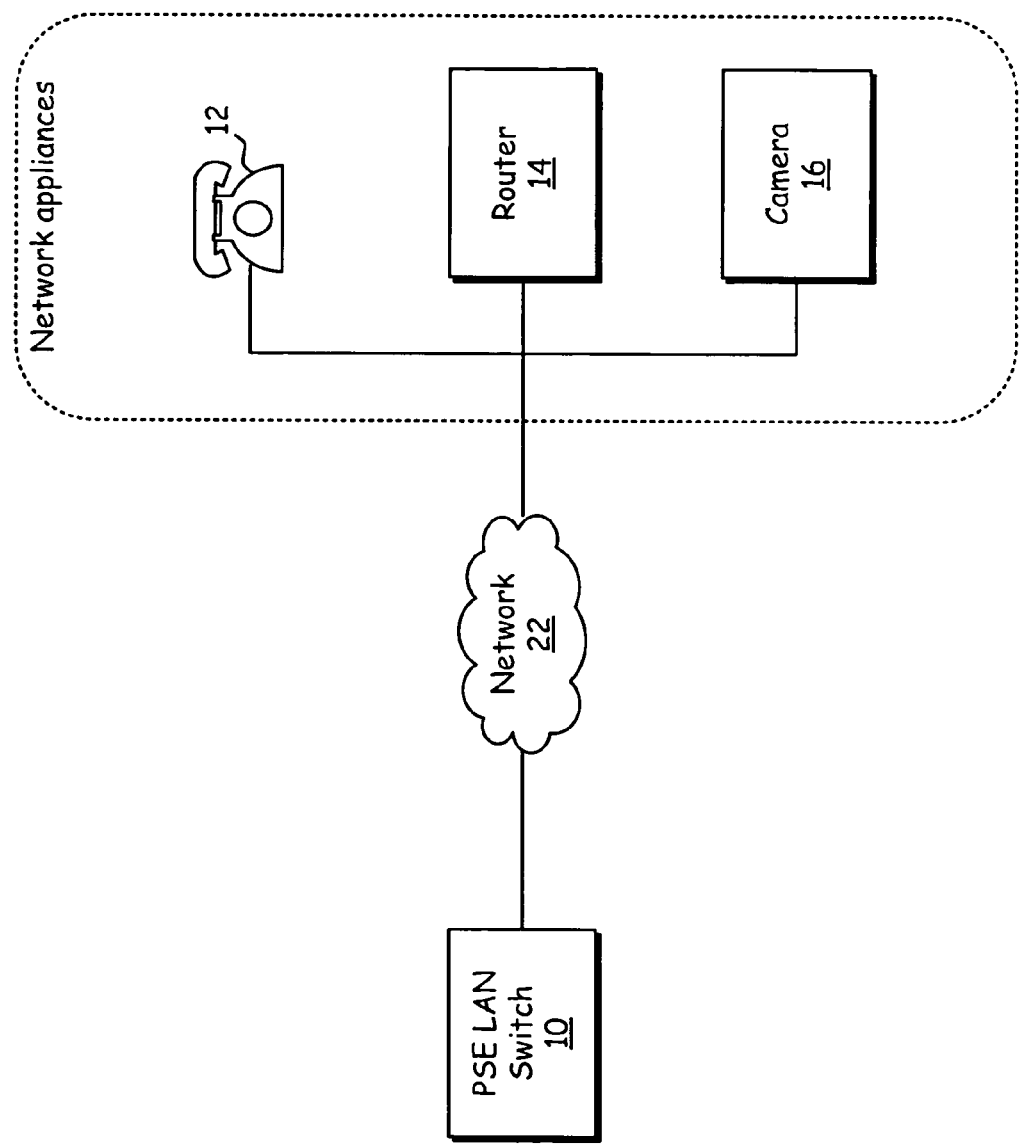
FIG. 1B depicts various Ethernet network powered devices (PDs) in accordance with embodiments of the present invention.

FIG. 1A illustrates exemplary devices where power is supplied separately to network attached client devices 12-16 that may benefit from receiving power and data via the network connection. These devices are serviced by LAN switch 10 for data. Additionally, each client device 12-16 has separate power connections 18 to electrical outlets 20. FIG. 1B illustrates exemplary devices where switch 10 is a power supply equipment (PSE) capable power-over Ethernet (PoE) enabled LAN switch that provides both data and power signals to client devices 12-16. The network attached devices may include VOIP telephone 12, access points, routers, gateways 14 and/or security cameras 16, as well as other known network appliances. This eliminates the need for client devices 12-16 to have separate power connections 18 to electrical outlets 20 as shown in FIG. 1A which are no longer required in FIG. 1B. Eliminating this second connection ensures that the network attached device will have greater reliability when attached to the network with reduced cost and facilitated deployment.

Figure 2A:
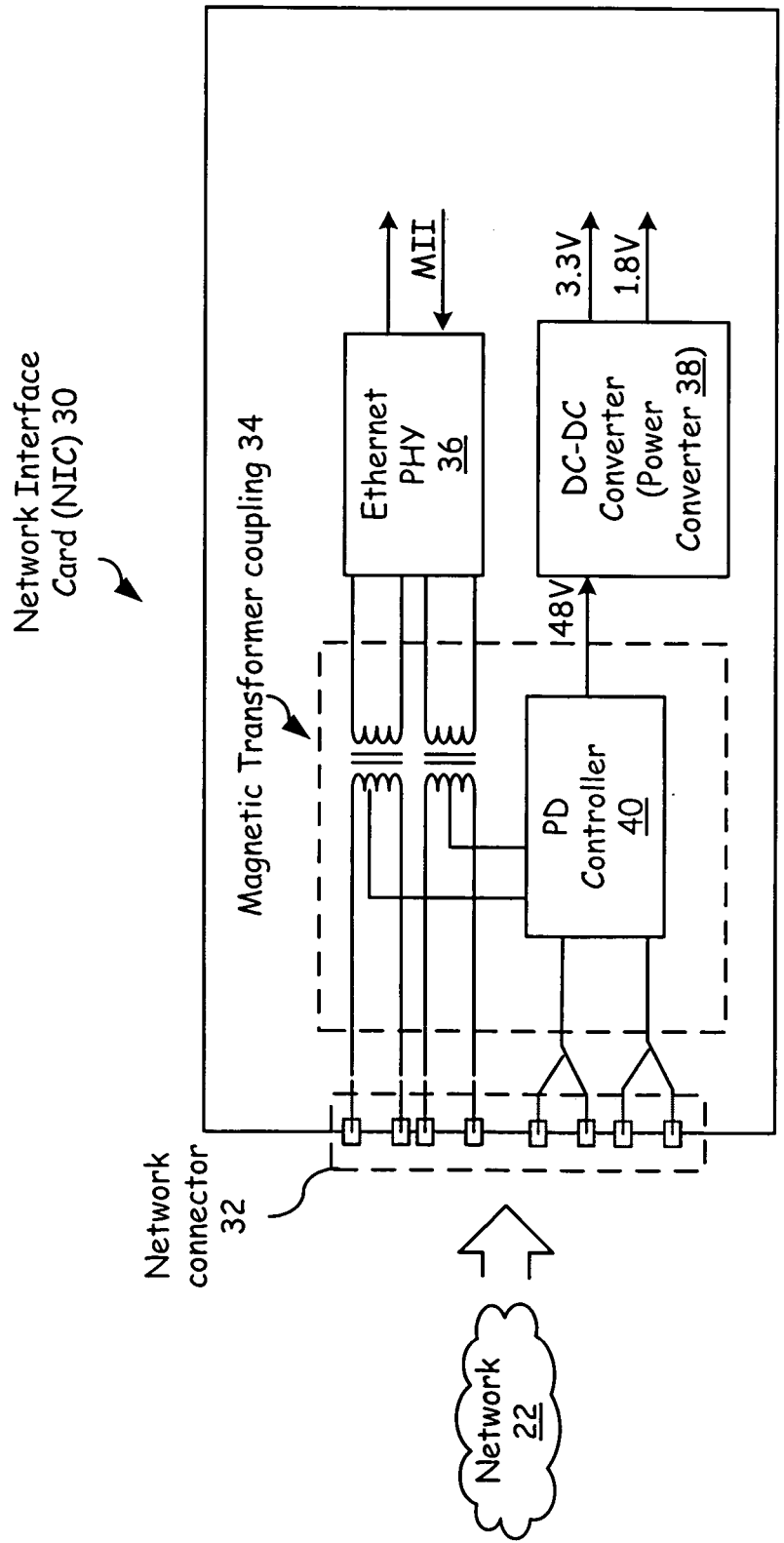
FIG. 2A shows a traditional real-estate intensive transformer based Network Interface Card (NIC)

FIG. 2A provides a typical prior art network interface card 30 for a PD that includes network connector 32, magnetic transformer 34, Ethernet PHY 36, power converter 38, and PD controller 40. Typically, these elements are all separate and discrete devices. Embodiments of the present invention are operable to eliminate the magnetic network transformer 34 and replace this discrete device with a power feed circuit. This power feed circuit may be implemented within an integrated circuit (IC) or as discrete components. Additionally, embodiments of the present invention may incorporate other functional specific processors, or any combination thereof into a single IC.

Figure 2B:
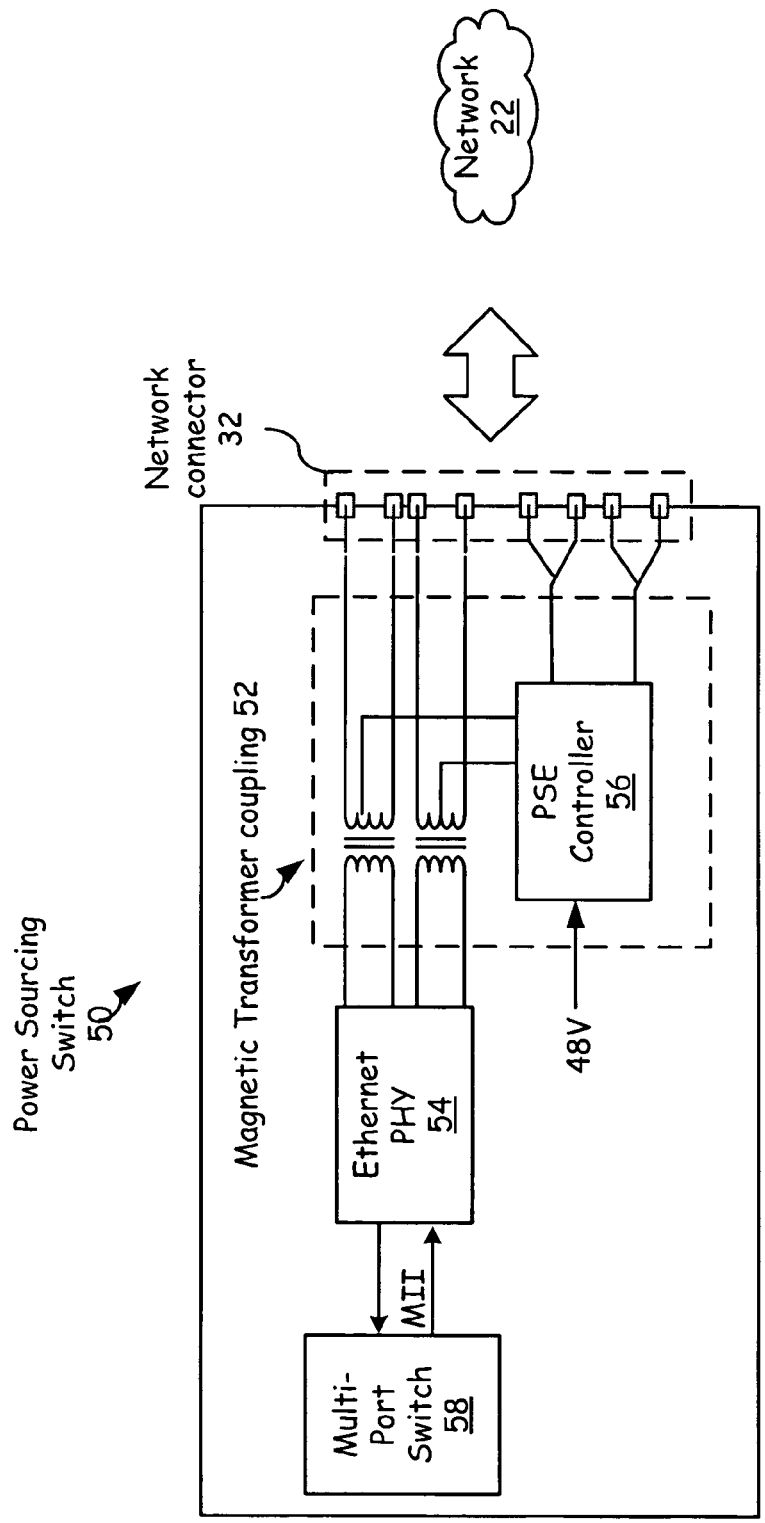
FIG. 2B provides a traditional functional block diagram of magnetic-based transformer power supply equipment (PSE)

FIG. 2B provides a typical PSE prior art device. Here, power sourcing switch 50 includes a network connector 32, magnetically coupled transformer 52, Ethernet physical layer 54, PSE controller 56, and multi-port switch 58. Typically these elements are all separate and discreet devices. Embodiments of the present invention are operable to eliminate the magnetically coupled transformer 52 and replace this transformer with discreet devices that may be implemented within ICs or as discreet devices.

Although the description herein may focus and describe a system and method for coupling high bandwidth data signals and power distribution between the IC and cable that uses transformer-less ICs with particular detail to the 802.3af Ethernet standard, these concepts may be applied in non-Ethernet applications and non 802.3af applications. Further, these concepts may be applied in subsequent standards that supersede the 802.3af standard.

Embodiments of the present invention may provide solid state (non-magnetic) transformer circuits operable to couple high bandwidth data signals and power signals with new mixed-signal IC technology in order to eliminate cumbersome, real-estate intensive magnetic-based transformers 34 and 52 as pictured in FIGS. 2A and 2B.

Modern communication systems use transformers 34 and 52 to provide common mode signal blocking, 1500 volt isolation, and AC coupling of the differential signature as well as residual lightning or electromagnetic shock protection. These functions are replaced by a solid state or other like circuits in accordance with embodiments of the present invention wherein the circuit may couple directly to the line and provide high differential impedance and low common mode impedance. High differential impedance allows separation of the PHY signal form the power signal. The low common mode impedance removes the need for a choke. This allows power to be tapped from the line. The local ground plane may float relative to local earth ground in order to eliminate the need for 1500 volt isolation. Additionally through a combination of circuit techniques and lightning protection circuitry, it is possible to provide voltage spike or lightning protection to the network attached device. This eliminates another function performed by transformers in traditional systems or arrangements. It should be understood that the technology may be applied anywhere where transformers are used and should not be limited to Ethernet applications.

Specific embodiments of the present invention may be applied to various powered network attached devices or Ethernet network appliances. Such appliances include, but are not limited to VOIP telephones, routers, printers, and other like devices known to those having skill in the art. Such exemplary devices are illustrated in FIG. 1B.

Figure 3A:
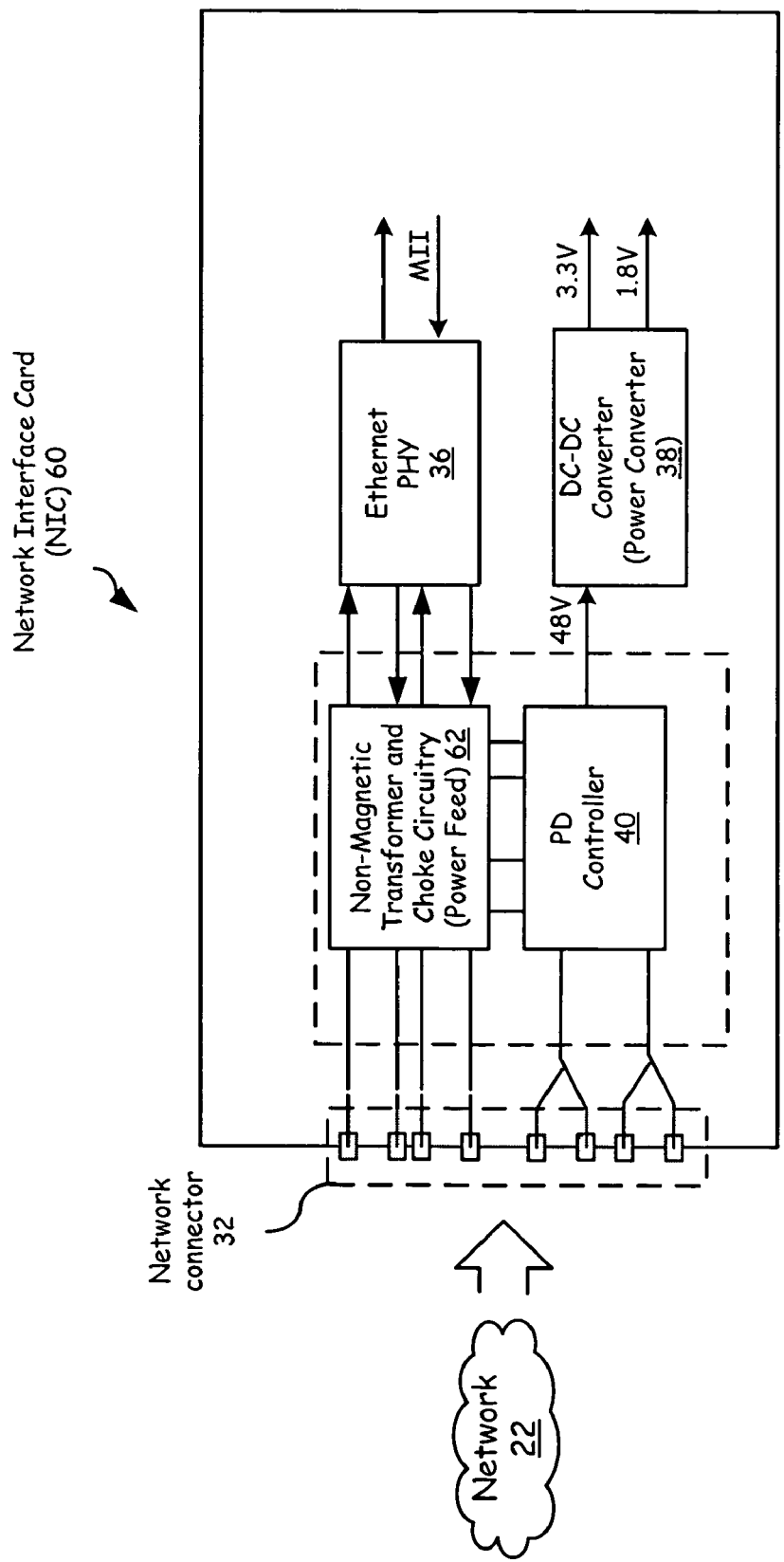
FIG. 3A provides a functional block diagram of a network powered device interface utilizing non-magnetic transformer and choke circuitry in accordance with embodiments of the present invention.

FIG. 3A is a functional block diagram of a network interface 60 that includes network connector 32, non-magnetic transformer and choke power feed circuitry 62, network physical layer 36, and power converter 38. Thus, FIG. 3A replaces magnetic transformer 34 with circuitry 62. In the context of an Ethernet network interface, network connector 32 may be a RJ45 connector operable to receive a number of twisted pairs. Protection and conditioning circuitry may be located between network connector 32 and non-magnetic transformer and choke power feed circuitry 62 to provide surge protection in the form of voltage spike protection, lighting protection, external shock protection or other like active functions known to those having skill in the art. Conditioning circuitry may take the form of a diode bridge or other like rectifying circuit. Such a diode bridge may couple to individual conductive lines 1-8 contained within the RJ45 connector. These circuits may be discrete components or an integrated circuit within non-magnetic transformer and choke power feed circuitry 62.

In an Ethernet application, the 802.3af standard (PoE standard) provides for the delivery of power over Ethernet cables to remotely power devices. The portion of the connection that receives the power may be referred to as the powered device (PD). The side of the link that provides the power is referred to as the power sourcing equipment (PSE). Two power feed options allowed in the 802.3af standard are depicted in FIG. 4A. In the first alternative, which will be referred to as alternative A, LAN switch 70, which contains PSE 76 feeds power to the Ethernet network attached device (PD) 72 along the twisted pair cable 74 used for the 10/100 Ethernet signal via the center taps 80 of Ethernet transformers 82. On the line side of the transfer, transformers 84 deliver power to PD 78 via conductors 1 and 2 and the center taps 86 and return via conductors 3 and 6 and the center taps 86. In the second alternative, conductors 4, 5, 7 and 8 are used to transmit power without transformers. Conductors 4, 5, 7 and 8 remain unused for 10/100 Ethernet data signal transmissions. FIG. 4B depicts that the network interface of FIG. 3A and power sourcing switch of FIG. 3B may be used to implements these alternatives and their combinations as well.

Returning to FIG. 3A, conductors 1 through 8 of the network connector 32, when this connector takes the form of an RJ45 connector, couple to non-magnetic transformer and choke power feed circuitry 62 regardless of whether the first or second alternative provided by 802.3af standard is utilized. These alternatives will be discussed in more detail with reference to FIGS. 4A and 4B. Non-magnetic transformer and choke power feed circuitry 62 may utilize the power feed circuit and separates the data signal portion from the power signal portion. This data signal portion may then be passed to network physical layer 36 while the power signal is passed to power converter 38.

In the instance where network interface 60 is used to couple the network attached device or PD to an Ethernet network, network physical layer 36 may be operable to implement the 10 Mbps, 100 Mbps, and/or 1 Gbps physical layer functions as well as other Ethernet data protocols that may arise. The Ethernet PHY 36 may additionally couple to an Ethernet media access controller (MAC). The Ethernet PHY 36 and Ethernet MAC when coupled are operable to implement the hardware layers of an Ethernet protocol stack. This architecture may also be applied to other networks. Additionally, in the event that a power signal is not received but a traditional, non-power Ethernet signal is received the nonmagnetic power feed circuitry 62 will still pass the data signal to the network PHY.

The power signal separated from the network signal within non-magnetic transformer and choke power feed circuit 62 by the power feed circuit is provided to power converter 38. Typically the power signal received will not exceed 57 volts SELV (Safety Extra Low Voltage). Typical voltage in an Ethernet application will be 48-volt power. Power converter 38 may then further transform the power as a DC to DC converter in order to provide 1.8 to 3.3 volts, or other voltages as may be required by many Ethernet network attached devices.

Figure 3B:
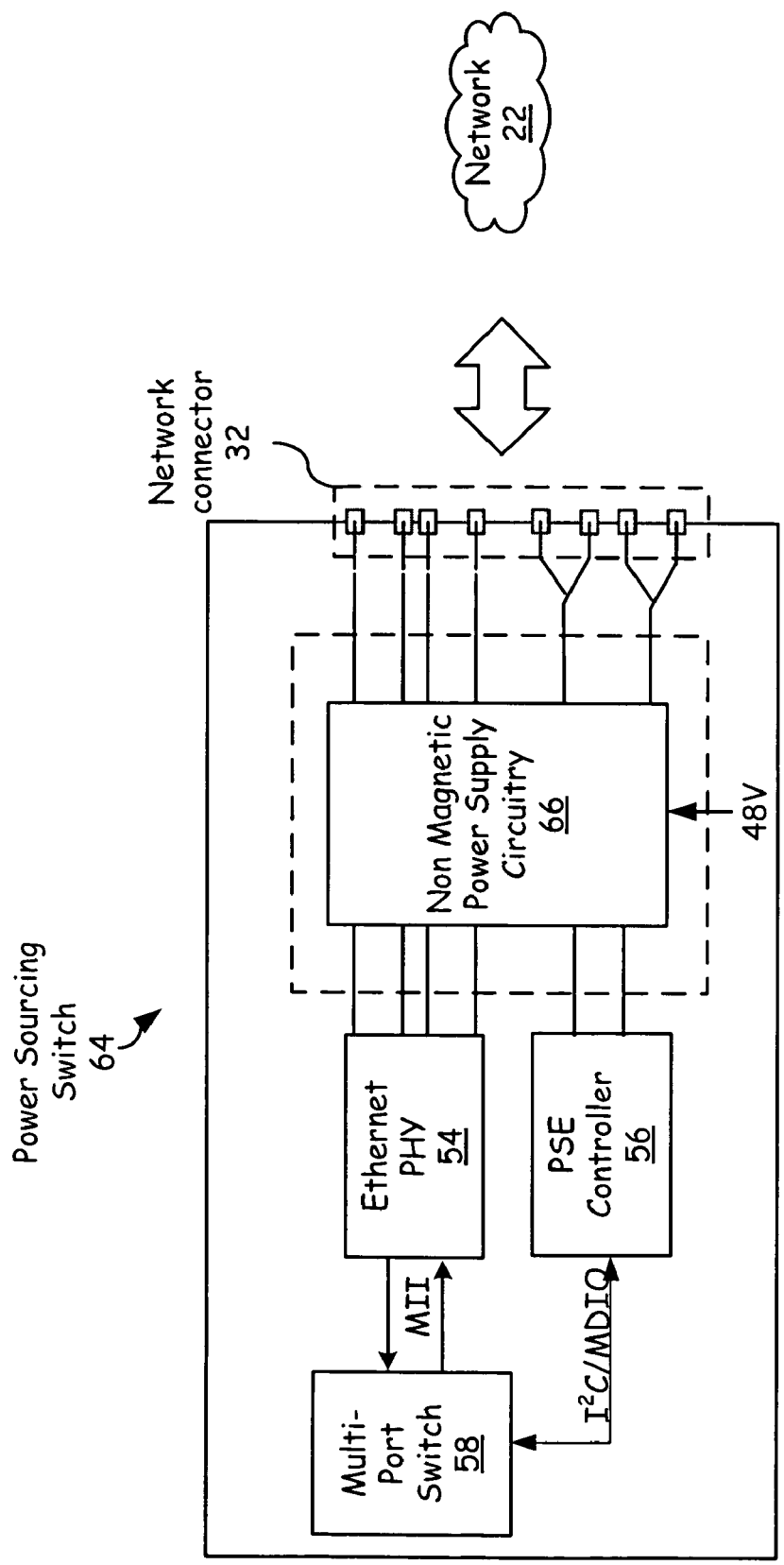
FIG. 3B provides a functional block diagram of a PSE utilizing non-magnetic transformer and choke circuitry in accordance with embodiments of the present invention.
Figure 4A:
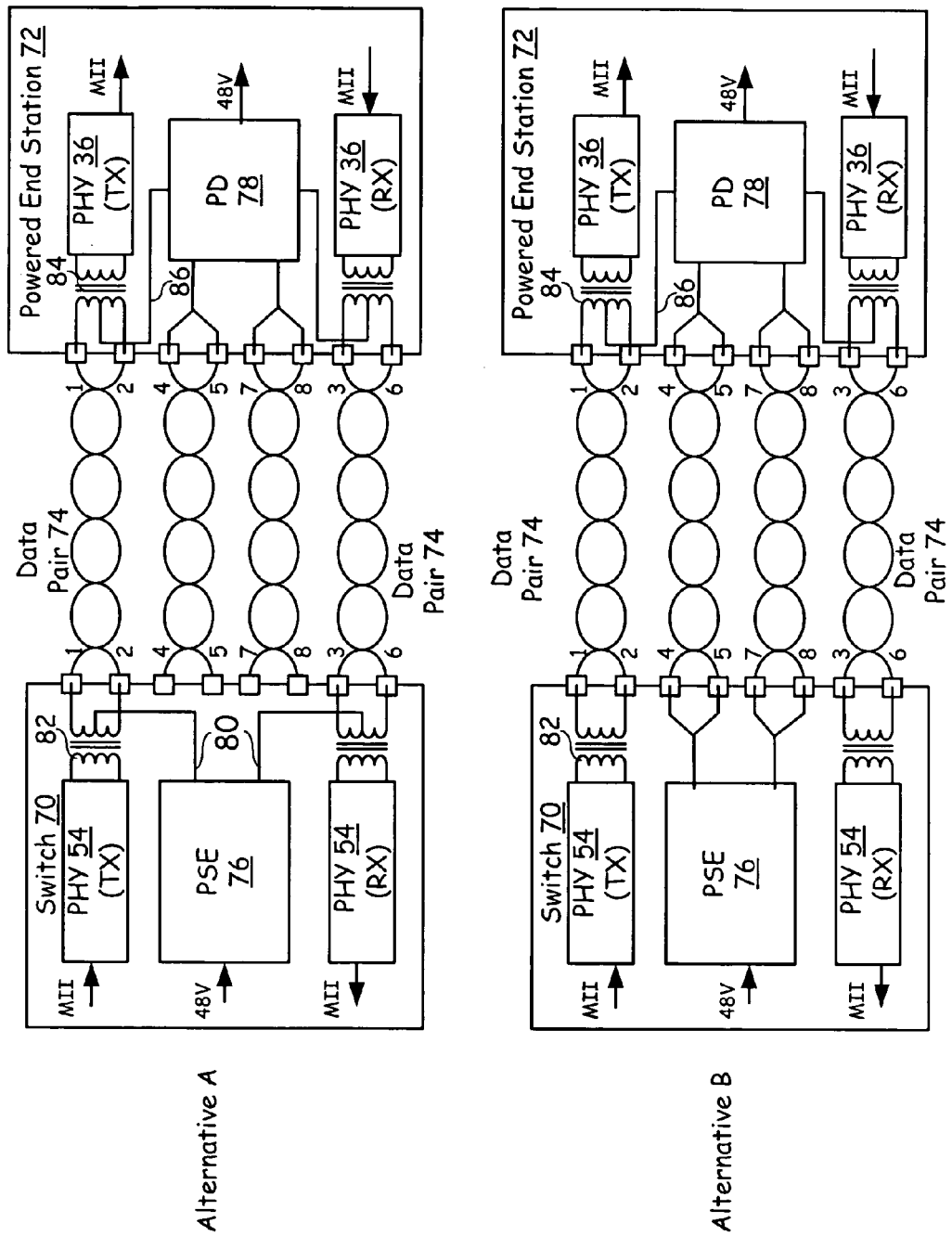
FIG. 4A illustrates two allowed power feeding schemes per the 802.3af standard.
Figure 4B:
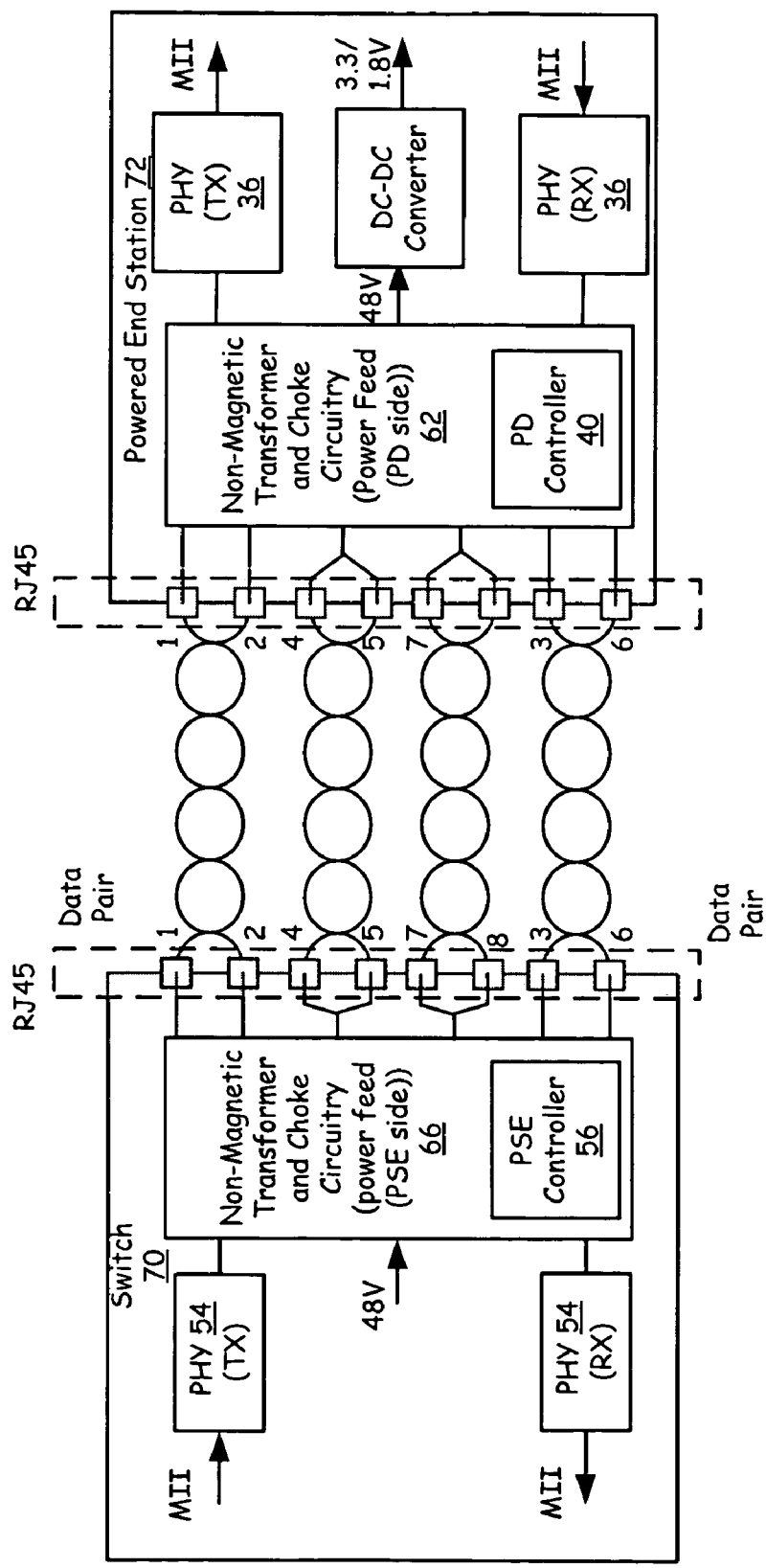
FIG. 4B illustrates the use of embodiments of the present invention to deliver both the power feeding schemes illustrated with FIG. 4A allowed per the 802.3af standard.

FIG. 3B is a functional block diagram of a power-sourcing switch 64 that includes network connector 32, Ethernet or network physical layer 54, PSE controller 56, multi-port switch 58, and non-magnetic transformer and choke power supply circuitry 66. FIG. 3B is similar to that provided in FIG. 2B, wherein the transformer has been replaced with non-magnetic transformer and choke power supply circuitry 66. This power-sourcing switch may be used to supply power to network attached devices in place of the power source equipment disclosed in FIG. 2B.

Network interface 60 and power sourcing switch 64 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All of these may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other like networks known to that having skill in the art. Other embodiments may supply power to network attached devices over alternative networks such as but not limited to a HomePNA local area network and other like networks known to those having skill in the art. The HomePNA uses existing phone wires to share a single network connection within a home or building. Alternatively, embodiments of the present invention may be applied where network data signals are provided over power lines.

Non-magnetic transformer and choke power feed circuitry 62 and 66 eliminate the use of magnetic transformers with integrated system solutions that provide the opportunity to increase system density by replacing magnetic transformers 34 and 52 with solid state power feed circuitry in the form of an IC or discreet component.

Figure 5A:
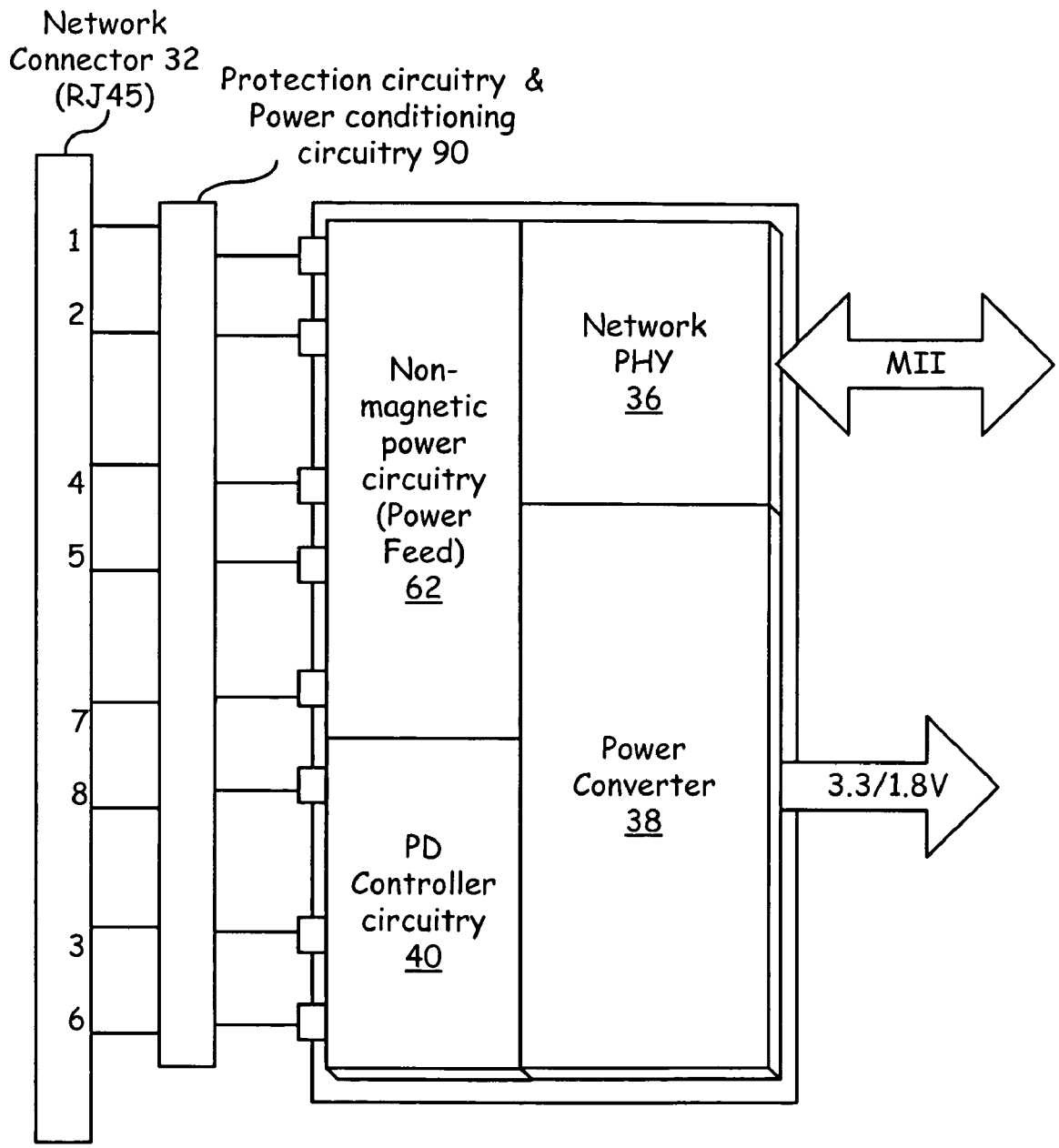
FIG. 5A shows an embodiment of a network powered device (PD) in accordance with an embodiment of the present invention that integrates devices at the IC level for improved performance.
Figure 5B:
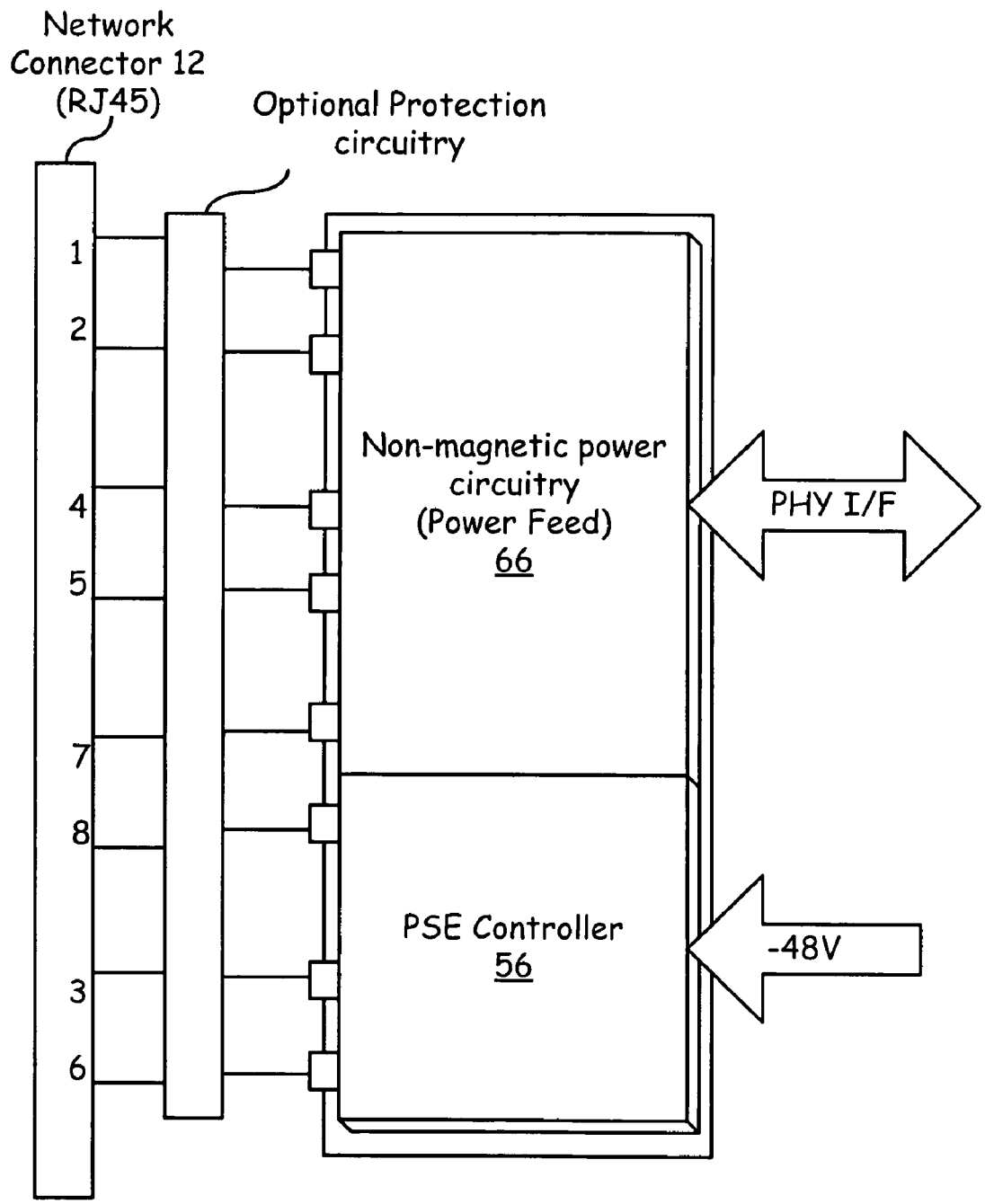
FIG. 5B shows an embodiment of a power source equipment (PSE) network device in accordance with an embodiment of the present invention that integrates devices at the IC level for improved performance.

FIG. 5A provides an illustration of an embodiment wherein the non-magnetic transformer and choke power feed circuitry 62, network physical layer 36, power distribution management circuitry 54, and power converter 38 are integrated into a single integrated circuit as opposed to being discrete components at the printed circuit board level. Optional protection and power conditioning circuitry 90 may be used to interface the IC to the network connector.

FIGS. 7-10 address ground plane issues that arise from integrating these components in a single IC.

The Ethernet PHY may support the 10/100/1000 Mbps data rate and other future data networks such as a 10000 Mbps Ethernet network. The non-magnetic transformer and choke power feed circuitry 62 will supply the line power minus the insertion loss directly to the power converter 38. This will convert the power first to a 12 v supply, then subsequently to the lower supply levels. This circuit may be implemented in the 0.18 or 0.13 micron process or other like process known to those having skill in the art.

The non-magnetic transformer and choke power feed circuitry 62 implements three main functions: 802.3.af signaling and load compliance, local unregulated supply generation with surge current protection and signal transfer between the line and integrated Ethernet PHY. As the devices are directly connected to the line, the circuit may be required to withstand a secondary lightning surge.

In order for the PoE to be 802.3af standard compliant, the PoE may be required to be able to accept power with either power feeding schemes illustrated in FIGS. 4A and 4B and handle power polarity reversal. A rectifier, such as a diode bridge, or a switching network, may be implemented to ensure power signals having an appropriate polarity are delivered to the nodes of the power feed circuit. Any one of the conductors 1,4,7 or 3 of the network RJ45 connection can forward bias to deliver current and any one of the return diodes connected can forward bias provide a return current path via one of the remaining conductors. Conductors 2, 5, 8 and 4 are connected in a similar fashion.

The non-magnetic transformer and choke power feed circuitry when applied to PSE may take the form of a single or multiple port switch in order to supply power to single or multiple devices attached to the network. FIG. 3B provides a functional block diagram of power sourcing switch 64 operable to receive power and data signals and then combine these with power signals, which are then distributed via an attached network. In the case where power sourcing switch 64 is a gateway or router, a high-speed uplink couples to a network such as an Ethernet network or other like network. This data signal is relayed via network PHY 54 and then provided to non-magnetic transformer and choke power feed circuitry 66. The PSE switch may be attached to an AC power supply or other internal or external power supply in order to provide a power signal to be distributed to network-attached devices that couple to power sourcing switch 64. Power controller 56 within or coupled to non-magnetic transformer and choke power feed circuitry 66 may determine, in accordance with IEEE standard 802.3af, whether or not a network-attached device, in the case of an Ethernet network-attached device, is a device operable to receive power from power supply equipment. When it is determined in the case of an 802.3af compliant PD is attached to the network, power controller 56 may supply power from power supply to non-magnetic transformer and choke power feed circuitry 66, which is then provided to the downstream network-attached device through network connectors, which in the case of the Ethernet network may be an RJ45 receptacle and cable.

The 802.3af Standard is intended to be fully compliant with all existing non-line powered Ethernet network systems. As a result, the PSE is required to detect via a well defined procedure whether or not the far end is PoE compliant and classify the amount of needed power prior to applying power to the system. Maximum allowed voltage is 57 volts to stay within the SELV (Safety Extra Low Voltage) limits.

In order to be backward compatible with non-powered systems the DC voltage applied will begin at a very low voltage and only begin to deliver power after confirmation that a PoE device is present. In the classification phase, the PSE applies a voltage between 14.5V and 20.5V, measures the current and determines the power class of the device. In one embodiment the current signature is applied for voltages above 12.5V and below 23 Volts. Current signature range is 0-44 mA.

The normal powering mode is switched on when the PSE voltage crosses 42 Volts. At this point the power MOSFETs are enabled and the large bypass capacitor begins to charge.

The maintain power signature is applied in the PoE signature block—a minimum of 10 mA and a maximum of 23.5 kohms may be required to be applied for the PSE to continue to feed power. The maximum current allowed is limited by the power class of the device (class 0-3 are defined). For class 0, 12.95W is the maximum power dissipation allowed and 400 ma is the maximum peak current. Once activated, the PoE will shut down if the applied voltage falls below 30V and disconnect the power MOSFETs from the line.

The power feed devices in normal power mode provide a differential open circuit at the Ethernet signal frequencies and a differential short at lower frequencies. The common mode circuit will present the PD controller and DC-DC converter load directly to the common mode of the line.

Figure 6A:
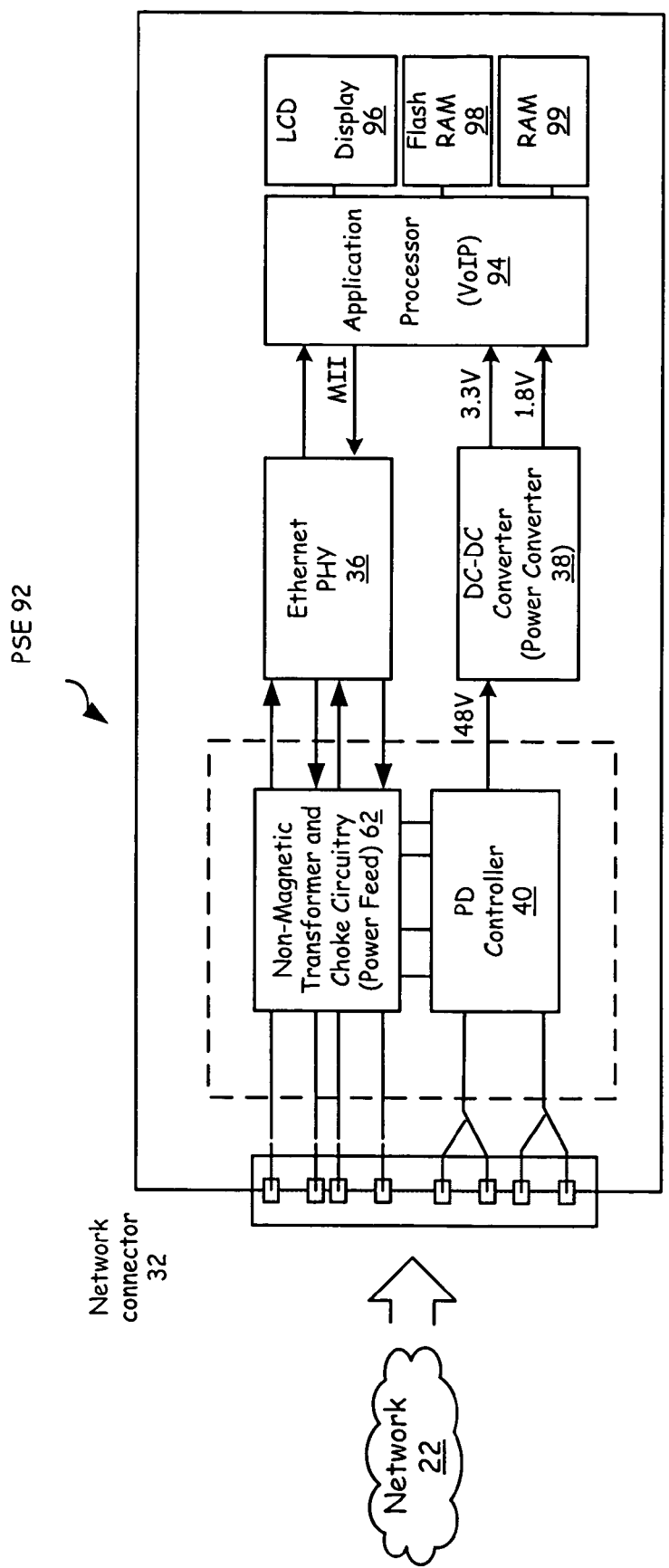
FIG. 6A illustrates the technology associated with embodiments of the present invention as applied in the case of an enterprise VoIP phone for PD applications.

FIG. 6A provides a functional block diagram of a specific network attached appliance 92. In this case, the network attached appliance is a VOIP telephone. Network connector 32 takes form of an Ethernet network connector, such as RJ45 connector, and passes Ethernet signals to power feed circuitry 62 and PD controller 40. Non-magnetic transformer and choke power feed circuitry 62 separates the data signal and power signal. An optional connection to an external isolated power supply allows the network attached device to be powered when insufficient power is available or when more power is required than can be provided over the Ethernet connection. The data signal is provided to network physical layer 36. Network physical layer 36 couples to a network MAC to execute the network hardware layer. An application specific processor, such as VOIP processor 94 or related processors, couples to the network MAC. Additionally, the VOIP telephone processors and related circuitry (display 96 and memory 98 and 99) may be powered by power converter 38 using power fed and separated from the network signal by non-magnetic transformer and choke power feed circuitry 62. In other embodiments, other network appliances, such as cameras, routers, printers and other like devices known to those having skill in the art are envisioned.

Figure 6B:
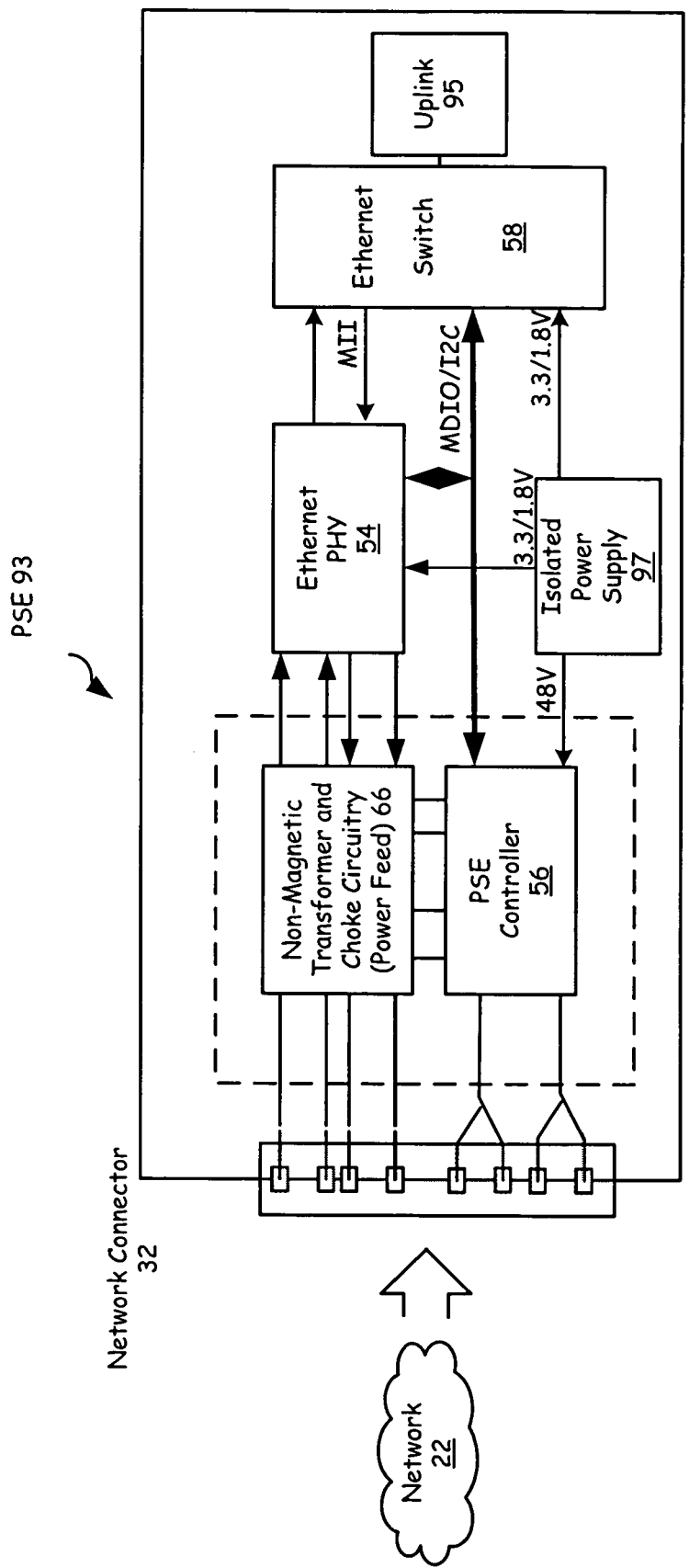
FIG. 6B illustrates the technology associated with an embodiment of the present invention as applied in the case of a network router for PSE applications.

FIG. 6B provides a functional block diagram of a specific network attached PSE device 93. In this embodiment, PSE network device 93 is an Ethernet router. Network connector 32 may take the form of Ethernet network connector such as an RJ-45 connector, and is operable to distribute Ethernet signals that include both power and data as combined by the integrated circuits within PSE 93. PSE 93 includes an integrated circuit 66 which serves as a nonmagnetic transformer and choke circuit.

The PSE devices may be a single port or multi-port. As a single port this device can also be applied to a mid-span application. Data is provided to Ethernet physical layer 54 either from network devices attached to network connector 32 or data received from an external network via internet switch 58 and uplink 95. Ethernet switch 58 could be an application specific processor or related processors that are operable to couple PSE 93 via uplink 95 to an external network.

PSE devices may be integrated into various switches and routers for enterprise switching applications. However, in non-standard networks e.g. automotive etc., these PSE devices may be integrated into controller for the attached devices. In the case of multimedia or content distribution, these PSE devices may be incorporated into a controller/set-top box that distributes content and power to attached devices.

Nonmagnetic transformer and choke circuitry 66 receives data from Ethernet physical layer 54. Additionally, power is supplied to the nonmagnetic transformer and choke circuitry 66 from isolated power supply 97. In one embodiment this is a 48-volt power supply. However, this power distribution system may be applied to other power distribution systems, such as 110 volt systems as well. PSE controller 56 receives the power signal from isolated power supply 97 and is operable to govern the power signal content within the Ethernet signal supplied by nonmagnetic transformer and choke circuitry 66. For example, PSE controller 56 may limit the Ethernet power signal produced by nonmagnetic transformer and choke circuitry 66 based on the requirements of an attached PD. Thus PSE controller 56 is operable to ensure that attached network PDs are not overloaded and are given a proper power signal. Power supply 97 also supplies as shown a power signal to Ethernet PHY 54, Ethernet switch 58.

Isolated power supply 97 may be attached to an AC power supply or other internal or external power supply in order to provide a power signal to be distributed to network-attached devices that couple to PSE 93. PSE controller 56 may determine, in accordance with IEEE standard 802.3af, whether or not a network-attached device, in the case of an Ethernet-attached device, is a device operable to receive power from power supply equipment. When it is determined that an 802.3af compliant PD is attached to the network, PSE controller 56 may supply power from power supply 97 to nonmagnetic transformer and choke circuitry 66, which is then provided to the downstream network-attached device through network connectors 32.

The 802.3af Standard is intended to be fully compliant with all existing non-line powered Ethernet systems. As a result, the PSE network device is required to detect via a well defined procedure whether or not the far end network attached device is POE compliant and classify the amount of needed power prior to applying power to the system. Maximum allowed voltage is 57 volts to stay within the SELV (Safety Extra Low Voltage) limits.

In order to be backward compatible with non-powered systems the DC voltage applied will begin at a very low voltage and only begin to deliver power after confirmation that a POE device is present. During classification the PSE network device applies a voltage between 14.5V and 20.5V, and measures the current to determine the power class of the device.

The PSE network device enters a normal power supply mode after determining that the PD is ready to receive power. At this point the power MOSFETs are enabled. During the normal power supply mode, a maintain power signature is sensed by the PSE to continue supplying power. The maximum current allowed is limited by the power class of the network attached device.

The power feed devices in normal power mode provide a differential open circuit at the Ethernet signal frequencies and a differential short at lower frequencies. The common mode circuit will present the PD controller and DC-DC converter load directly to the common mode of the line. In detection/classification and disconnect modes, the power transistors within the IC may be disabled to prevent the loading of the PSE detection circuitry.

Figure 7A:
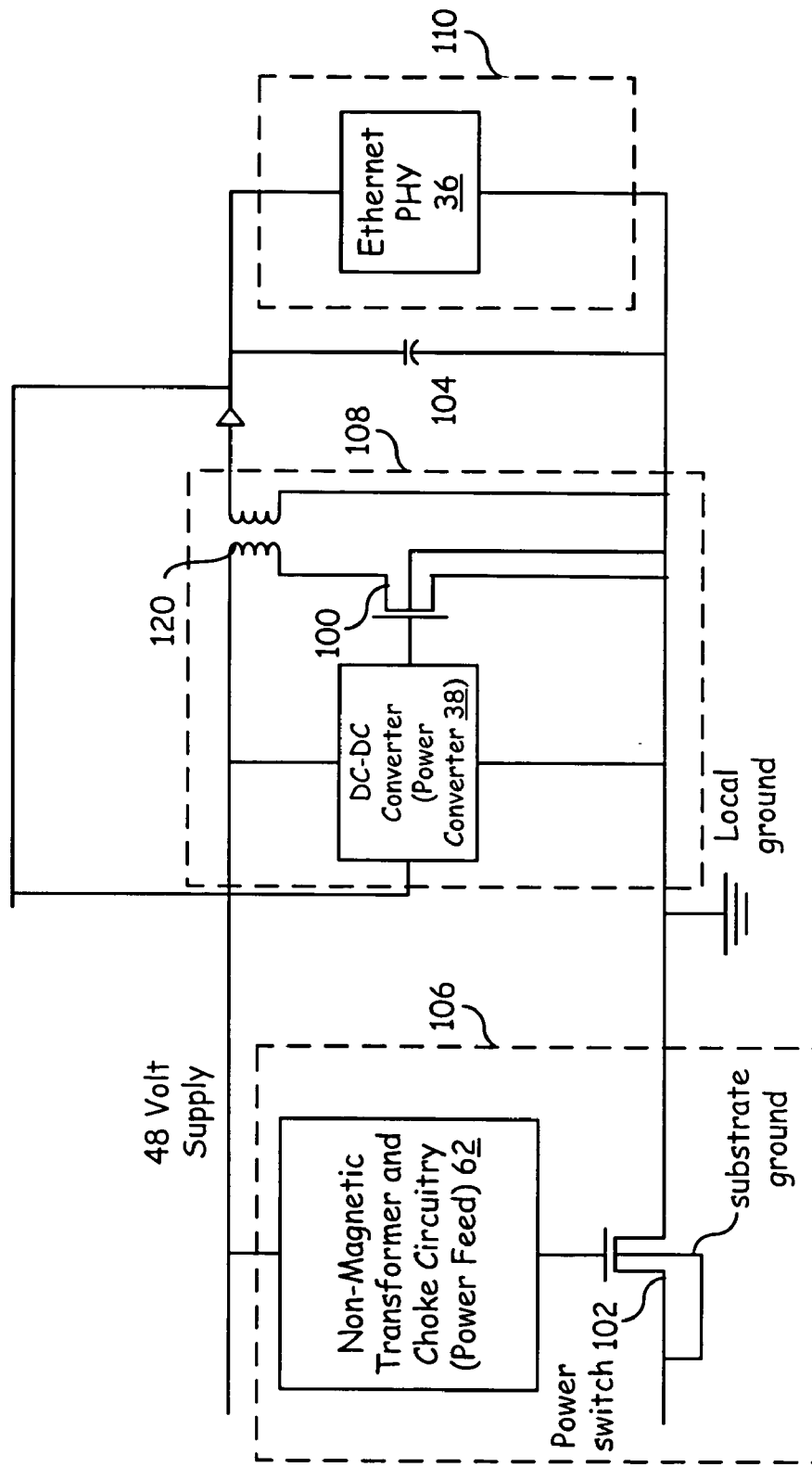
FIG. 7A provides a block diagram of a circuit operable to produce a PoE signal.
Figure 7B:
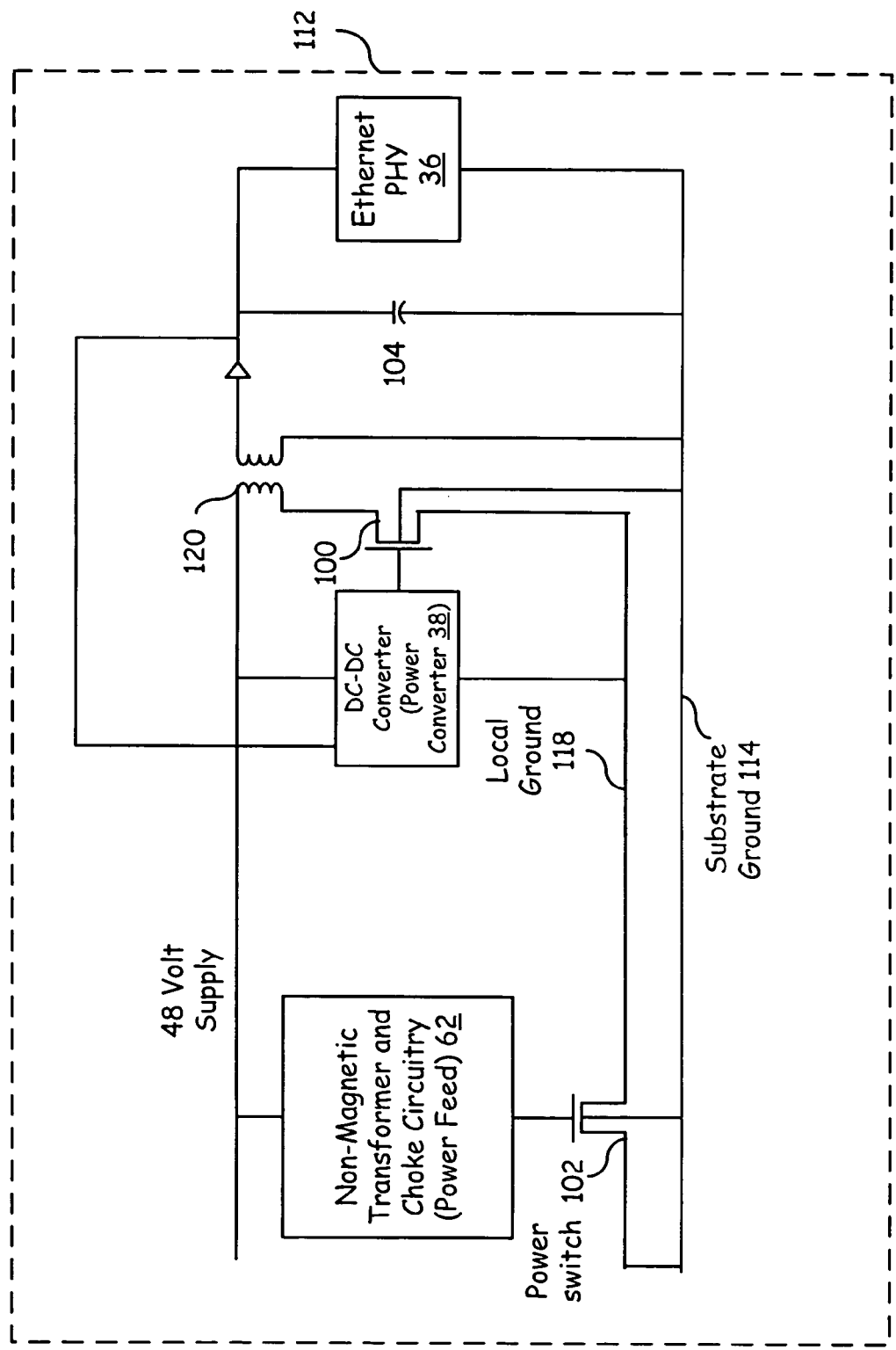
FIG. 7B provides a block diagram of an IC in accordance with embodiments of the present invention.

FIG. 7A depicts discrete IC components operable to support the distribution of power over the Ethernet. The ICs of FIGS. 7A and 7B include power feed circuit 62, a DC/DC converter 38 and Ethernet PHY module 36. When power is disabled the local ground may float up to the supply voltage (i.e. 48 volt supply). This is not a problem when the Ethernet PHY 36, DC-DC power converter 38, and power feed circuit 62 are discrete IC components 106, 108, and 110 respectively as shown in FIG. 7A. However, FIG. 7B depicts an instance where the Ethernet PHY 36, DC-DC power converter 38, and power feed circuit 62 are integrated into a single IC 112 and thus share a single substrate 114. High voltages across the fine line structures or other sensitive circuits (i.e. low voltage circuits) in such an instance can easily destroy the device.

The Ethernet PHY module, or other like circuits, may contain fine line structures which may be limited to a maximum voltage. For example, the fine line structures of the Ethernet PHY module may be limited to a 3-volt maximum. Thus, if the ground of the Ethernet PHY module were to float or latch up to the 48-volt supply voltage provided to the power feed circuit or DC-DC power converter, a significant risk would arise from the increased potential that may be placed on the Ethernet PHY module. This large voltage potential could potentially damage or destroy the fine line structures within the Ethernet PHY module or other like components that contain fine line structures.

FIG. 7B provides an embodiment where PHY 36, DC-DC power converter 38, and power feed circuit 62 are integrated onto a single substrate. Thus, the Ethernet PHY module or other IC components containing fine line structures (i.e. low voltage circuits) may be isolated from the 48 volt power supply. In the instance in FIG. 7B, pulsed power switch 100 is coupled to the local ground such that the Ethernet PHY module 36 cannot rise to the potential of the 48 volt rail voltage supplied to the DC to DC power converter and power feed circuit. Power switch 102 prevents power feed circuit 62 from supplying power until an enable signal has been provided to the power feed circuit.

DC-DC power converter 38 receives a first DC signal, such as a 48-volt signal supplied by the 48-volt rail, and provides an output signal to pulse switch 100 which will produce a second DC signal which may have a lower voltage such as a 3-volt maximum power signal to be applied to the Ethernet PHY module 36. When Ethernet PHY module 36 is connected to local ground as in FIG. 7A, the ground plane of the Ethernet PHY module 36 can float towards the 48-volt signal provided to the DC-DC power converter. This can potentially damage the fine line structures within the Ethernet PHY. To prevent this, these components share a common substrate ground 114 as shown in FIG. 7B wherein the substrate ground is tied to local ground 118 when power switch 102 is enabled. This substrate ground may be coupled to an earth ground or a predefined potential. Additionally, power switch 102 may limit the current passed by the primary side of transformer 120. This current limit action also helps to limit the voltage seen on the secondary side of transformer 120.

In addition to the components shown, the IC may further include a PSE controller, media processor, home plug manager, factory controller, multi-port switch, Ethernet switch module or other like components. Some of these components may also contain fine line structures and may require use of the common substrate ground to prevent damage to these sensitive circuits.

Figure 8:
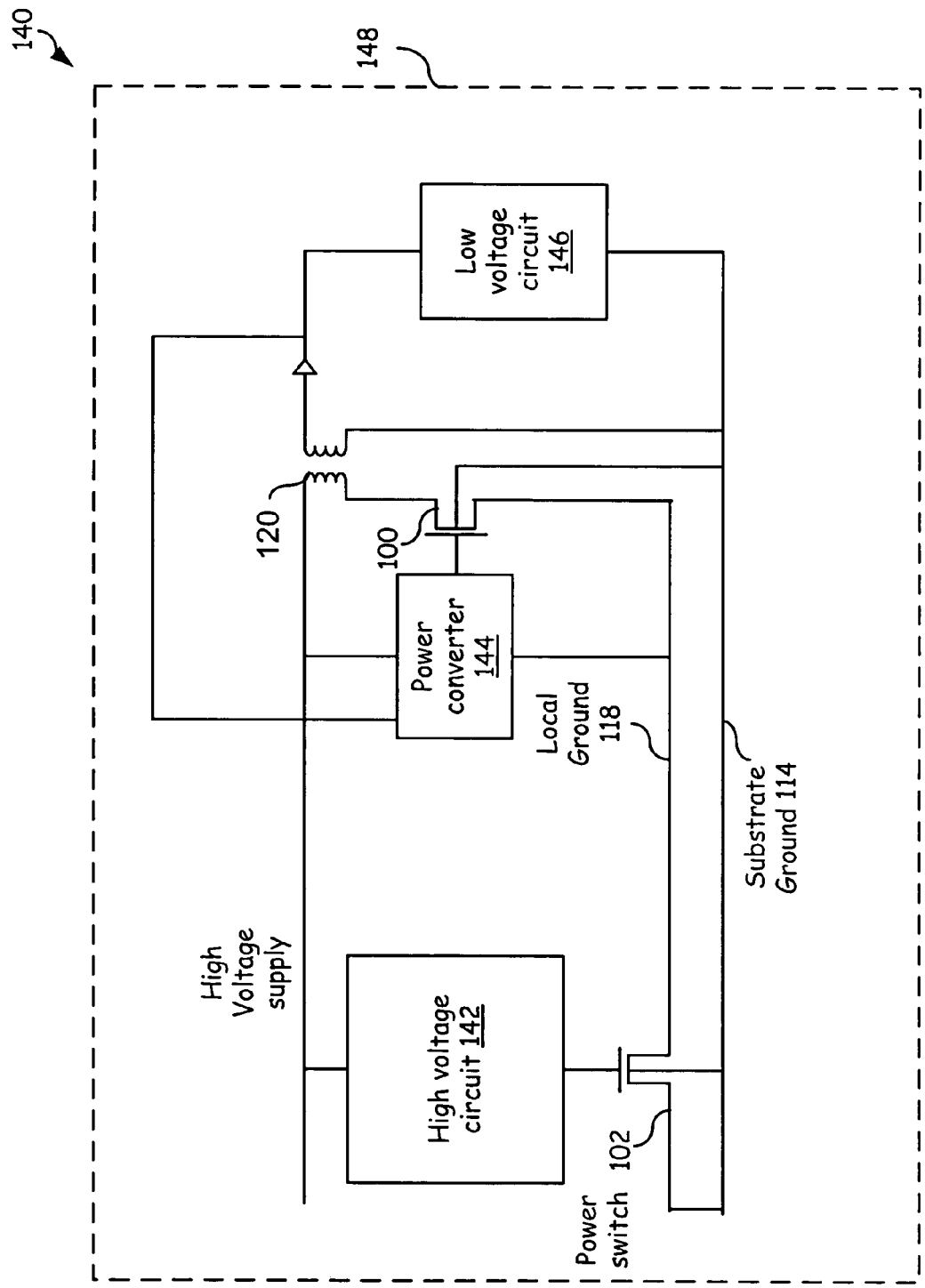
FIG. 8 provides a block diagram of an IC having various circuits which-require different voltages on a single substrate in accordance with an embodiment of the present invention.

FIG. 8 provides an IC that addresses this potential hazard when seen in other ICs that incorporate both high and low voltage devices onto a single substrate. Here the fine line structures of a component within then IC, such as low voltage circuit 146, are kept from being exposed to the large potential voltage of a higher voltage supply. IC 140 of FIG. 8 includes high voltage circuit 142, power converter 144, low voltage circuit 146, pulse power switch 100 and power switch 102. These components share a common substrate ground 114 wherein the substrate ground is tied to local ground 118 when power switch 102 is enabled. As discussed in FIG. 7B, power switch 102 of may limit the current passed by the primary side of transformer 120. This current limit action also helps to limit the voltage seen on the secondary side of transformer 120.

Figure 9:
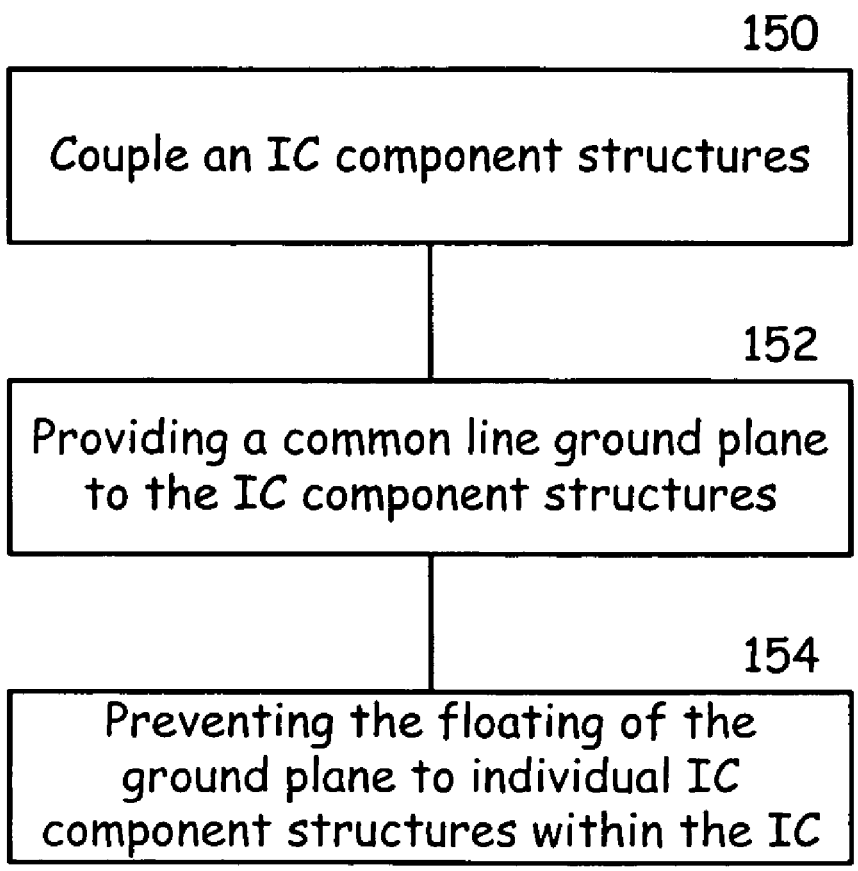
FIG. 9 provides a logic flow diagram in accordance with an embodiment of the present invention.

FIG. 9 provides a logic flow diagram in accordance with an embodiment of the present invention. In this logic flow diagram, ground protection is provided to individual components within an IC. In step 150 IC component structures are coupled to one another as required in the IC design. Some of these IC component structures may include fine line structures which may be damaged when the voltage to which the fine line structures are exposed, exceeds a threshold such as 3 volts. Within highly ICs where different voltages are required problems in integrating these components can arise. For example, when the PoE IC includes a DC-DC power converter, this component may receive voltages that would damage other portions of the IC. The 48-volt signal could significantly damage fine line structures contained within other components. To address this situation, step 152 provides a common substrate ground to the coupled IC component structures. This common substrate ground prevents the ground plane associated with any individual IC component coupled thereto from floating in step 154.

In summary, embodiments of the present invention provide an integrated circuit (IC) having an integrated DC-DC power converter therein. This IC is operable to support the distribution of combined power and data signals in a network environment such as an Ethernet network according to protocols such as the power over Ethernet (PoE) protocol. The IC includes a DC-DC power converter, a power feed circuit, and a network physical layer (PHY) module, wherein the PHY module may contain fine line structures susceptible to damage when exposed to excessive voltages. To prevent or reduce the likelihood of damage to the PHY module from voltages supplied to the DC-DC power converter, a common substrate ground is shared between the IC components.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although embodiments of the present invention are described in detail, it should be understood that various changes, substitutions and alterations can be made hereto without departing from the spirit and scope of the invention.

What is claimed is:

1. An integrated circuit (IC) on a substrate, comprising:
   a DC-DC converter operable to receive a first DC signal and produce a second DC signal;
   a network physical layer (PHY) module, wherein the network PHY module is powered by the second DC signal;
   a power feed circuit electrically coupled to the DC-DC converter and network PHY module, wherein the power feed circuit is operable to:
      exchange data signals with the network PHY module; and
      pass a combined data and power signal to a network connection as directed by a power source equipment (PSE) controller, wherein the power signal is based on the first DC signal; and
   a power switch operable to couple a local ground shared by the DC-DC converter and power feed circuit to a common substrate ground coupled to the network PHY module.

2. The IC of claim 1, wherein the common substrate ground reduces a voltage potential across fine line structures within the network PHY module.

3. The IC of claim 2, further comprising additional low voltage circuits that comprise fine line structures.

4. The IC of claim 1, wherein the common substrate ground prevents a ground associated with the network PHY module from floating.

5. The IC of claim 1, wherein the IC further comprises at least one circuit selected from the group consisting of:
   the PSE controller;
   a media processor;
   a factory controller;
   a multiport switch;
   an Ethernet switch; and
   the network PHY module.

6. The IC of claim 1, wherein the network PHY module is operable to implement physical layer functions associated with data rates selected from the group of data rates consisting of: 10 Mbps, 100 Mbps, 1 Gbps, and 10 Gbps.

7. The IC of claim 1, wherein the IC further comprises a multi-port switch operable to couple the network PHY module to an external network.

8. A method to provide ground protection to integrated circuit (IC) components on a common substrate, comprising:
   electrically coupling IC component structures, wherein at least one IC component comprises a low voltage component and at least one IC component comprises a high voltage component; and
   providing a common substrate ground to the coupled IC component structures, wherein the common substrate ground prevents a ground of individual IC component structures from floating
   wherein the at least one IC component is located within a power over Ethernet (PoE) device coupled to an Ethernet network, wherein the at least one IC component is operable to pass an Ethernet signal that includes power and data.

9. The method of claim 8, wherein the common substrate ground reduces a voltage potential across fine line structures within circuits of the at least one IC component.

10. The method of claim 8, wherein the IC component structures comprise:
    a power feed circuit;
    an Ethernet physical layer (PHY) module; and
    a DC-DC converter.

11. The method of claim 10, wherein the Ethernet PHY module comprises fine line structures.

12. The method of claim 10, wherein the Ethernet PHY module is operable to implement physical layer functions associated with data rates selected from the group of data rates consisting of: 10 Mbps, 100 Mbps, 1 Gbps, and 10 Gbps.

13. The method of claim 8, wherein the at least one IC component further comprises at least one circuit selected from the group consisting of:
    the PSE controller;
    a media processor;
    a home plug manager;
    factory controller;
    a multiport switch;
    an Ethernet switch; and
    the network PHY module.

14. The method of claim 13, wherein the Ethernet network comprises at least one network selected from the group consisting of:
    a vehicle based network;
    a high speed data network;
    a low speed data network;
    a local-interconnect network (LIN);
    a controller area network (CAN);
    a FlexRay network;
    a TTCAN network;
    a J1939 compliant network;
    a ISO 11898 compliant network;
    a Homeplug network;
    a Home PNA network; and
    an ISO 11519-2 compliant network.

15. A power over Ethernet (PoE) network device operable to distribute both an Ethernet power signal and an Ethernet data signal through a coupled Ethernet network, comprising:
    an Ethernet network connector operable to physically couple the PoE network device to the Ethernet network;
    a PoE controller; and
    an integrated circuit (IC) coupled to the Ethernet network connector that further comprises:
       an Ethernet physical layer (PHY) module;
       a DC-DC converter operable to receive a high voltage signal and produce a low voltage signal;
       a power feed circuit electrically coupled to the DC-DC converter, wherein the power feed circuit is operable to:
          produce a power signal from the high voltage signal;
          exchange data signals with the Ethernet PHY module; and pass a combined data and power signal to a network connection as directed by a power source equipment (PSE) controller; and a power switch operable to couple a local ground shared by the DC-DC converter and power feed circuit to a common substrate ground coupled to the network PHY module, and wherein the DC-DC converter, power feed circuit and Ethernet PHY module are fabricated on a common substrate.

16. The PoE network device of claim 15, wherein the common substrate ground is operable to prevent a ground plane for components within the IC from floating.

17. The PoE network device of claim 16, wherein the common substrate ground is operable to reduce a voltage potential across the IC.

18. The PoE network device of claim 15, wherein the common substrate ground reduces a voltage potential across fine line structures within low voltage circuits of the IC.

19. The PoE network device of claim 15, wherein the Ethernet PHY module comprises a fine line structure.

20. The PoE network device of claim 19, wherein the Ethernet network comprises at least one network selected from the group consisting of:
a vehicle based network;
a high speed data network;
a low speed data network;
a local-interconnect network (LIN);
a controller area network (CAN);
a FlexRay network;
a TTCAN network;
a J1939 compliant network;
a ISO 11898 compliant network;
a Homeplug network;
a Home PNA network; and
an ISO 11519-2 compliant network.

21. The PoE network device of claim 15, wherein the Ethernet PHY module is operable to implement physical layer functions associated with data rates selected from the group of data rates consisting of: 10 Mbps, 100 Mbps, 1Gbps, and 10 Gbps.

22. The PoE network device of claim 5, wherein the IC further comprises at least one circuit selected from the group consisting of:
the PSE controller;
a media processor;
a home plug manager;
factory controller;
a multiport switch;
an Ethernet switch; and
the network PHY module.

23. An integrated circuit (IC) on a substrate, comprising:
a high voltage bus;
at least one high voltage circuit coupled to the high voltage bus;
a DC-DC converter coupled to the high voltage bus, wherein the DC-DC converter is operable to produce a low voltage supply;
at least one low voltage circuit powered from the low voltage power supply;
wherein the DC-DC converter, at least one high voltage circuit, and at least one low voltage circuit share a common substrate ground; and
a power switch operable to couple a local ground shared by the DC-DC converter and the at least one high voltage circuit to the common substrate ground coupled to the at least one low voltage circuit.

* * * * *